(12) United States Patent
Splitz

(10) Patent No.: US 10,638,419 B2
(45) Date of Patent: Apr. 28, 2020

(54) ASYMMETRICAL HAIL TIMING

(71) Applicant: Mueller International, LLC, Atlanta, GA (US)

(72) Inventor: David Edwin Splitz, Sandwich, MA (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 16/214,489

(22) Filed: Dec. 10, 2018

(65) Prior Publication Data

US 2019/0110249 A1    Apr. 11, 2019

Related U.S. Application Data

(63) Continuation of application No. 15/206,851, filed on Jul. 11, 2016, now Pat. No. 10,200,947.

(51) Int. Cl.
*H04W 52/02* (2009.01)

(52) U.S. Cl.
CPC ............ *H04W 52/02* (2013.01); *Y02D 70/00* (2018.01); *Y02D 70/142* (2018.01);
(Continued)

(58) Field of Classification Search
CPC ..... G06T 1/20; H04L 43/0876; H04L 47/822; H04L 49/10; H04L 49/45; H04L 67/1097;
(Continued)

(56) References Cited

U.S. PATENT DOCUMENTS

| 5,252,967 A | 10/1993 | Brennan, Jr. et al. |
| 5,371,734 A | 12/1994 | Fischer |

(Continued)

FOREIGN PATENT DOCUMENTS

| EP | 2772074 | 8/2018 |
| WO | 2009133237 | 11/2009 |

(Continued)

OTHER PUBLICATIONS

Cullinan, Thomas; Non-Final Office Action for U.S. Appl. No. 15/098,986, filed Apr. 14, 2016, dated Feb. 26, 2019, 15 pgs.

(Continued)

*Primary Examiner* — Eric Nowlin
(74) *Attorney, Agent, or Firm* — Taylor English Duma LLP

(57) ABSTRACT

A method includes transmitting first hail messages from a first device at a first hailing rate, wherein a first time between beginnings of each consecutive first hail message is a first period, each first hail message transmitted for a first length of time, and a first gap extends between an end of each first hail message and a start of a next first hail message; listening at the first device for a second hail message repeatedly transmitted at a second hailing rate, wherein a second time between beginnings of each consecutive second hail message is a second period, each second hail message transmitted for a second length of time, and a second gap extends between an end of each second hail message and a start of a next second hail message; and performing, at the first device, a channel activity detection of a preamble in the second hail message.

20 Claims, 9 Drawing Sheets

(52) U.S. Cl.
CPC .......... *Y02D 70/144* (2018.01); *Y02D 70/146* (2018.01); *Y02D 70/164* (2018.01)

(58) Field of Classification Search
CPC ............... H04W 56/00; H04W 56/001; H04W 56/0015; H04W 64/00; H04W 84/12; H04W 84/20
See application file for complete search history.

(56) References Cited

U.S. PATENT DOCUMENTS

| | | |
|---|---|---|
| 5,594,776 A | 1/1997 | Dent |
| 5,666,655 A | 9/1997 | Ishikawa et al. |
| 5,774,733 A | 6/1998 | Nolan et al. |
| 5,787,358 A | 7/1998 | Takahashi |
| 5,892,441 A | 4/1999 | Woolley et al. |
| 5,963,557 A | 10/1999 | Eng |
| 6,028,855 A | 2/2000 | Hirsch |
| 6,031,466 A | 2/2000 | Leshets et al. |
| 6,405,047 B1 | 6/2002 | Moon |
| 6,512,463 B1 | 1/2003 | Campbell et al. |
| 6,717,926 B1 | 4/2004 | Deboille et al. |
| 6,900,737 B1 | 5/2005 | Ardalan |
| 7,123,628 B1 | 10/2006 | Hwang |
| 7,202,800 B2 | 4/2007 | Choi |
| 7,272,635 B1 | 9/2007 | Longtin et al. |
| 7,313,164 B1 | 12/2007 | Wilson et al. |
| 7,346,030 B2 | 3/2008 | Cornwall |
| 7,420,942 B2 | 9/2008 | Wang |
| 7,564,826 B2 | 7/2009 | Sherman et al. |
| 7,729,329 B2 * | 6/2010 | Fujita ............... H04W 74/0816 370/342 |
| 7,760,703 B2 | 7/2010 | Kubler et al. |
| 7,830,874 B2 | 11/2010 | Cornwall et al. |
| 7,843,379 B2 | 11/2010 | Menzer et al. |
| 7,962,101 B2 | 6/2011 | Vaswani et al. |
| 8,014,791 B2 | 9/2011 | Guigne et al. |
| 8,194,636 B1 | 6/2012 | Doherty et al. |
| 8,300,626 B2 | 10/2012 | Thubert et al. |
| 8,375,134 B2 | 2/2013 | Herzog et al. |
| 8,391,177 B2 | 3/2013 | Picard |
| 8,577,044 B2 | 11/2013 | Raikar |
| 8,660,134 B2 | 2/2014 | Splitz |
| 8,797,871 B2 | 8/2014 | Morandin |
| 8,855,569 B2 | 10/2014 | Splitz |
| 8,918,091 B1 | 12/2014 | Hoelzle et al. |
| 8,933,789 B1 | 1/2015 | Fink et al. |
| 9,179,502 B2 | 11/2015 | Fischer |
| 9,204,341 B2 | 12/2015 | Su |
| 9,204,405 B2 | 12/2015 | Hildebrandt et al. |
| 9,271,231 B2 | 2/2016 | Nucci |
| 9,408,112 B2 | 8/2016 | Su |
| 9,565,620 B2 | 2/2017 | Dukes |
| 9,743,458 B2 | 8/2017 | Jain et al. |
| 9,756,089 B2 | 9/2017 | Brook |
| 9,807,793 B2 | 10/2017 | Fischer |
| 9,854,607 B1 | 12/2017 | Chu et al. |
| 9,883,548 B2 | 1/2018 | Backholm et al. |
| 9,961,694 B2 | 5/2018 | Gao et al. |
| 10,025,960 B1 | 7/2018 | Fink et al. |
| 10,039,018 B2 | 7/2018 | Splitz et al. |
| 10,070,403 B2 | 9/2018 | Grady et al. |
| 10,097,411 B2 | 10/2018 | Splitz et al. |
| 10,178,617 B2 | 1/2019 | Splitz et al. |
| 10,200,947 B2 | 2/2019 | Splitz |
| 10,267,652 B1 | 4/2019 | Magley et al. |
| 2002/0051546 A1 | 5/2002 | Bizjak |
| 2002/0159434 A1 | 10/2002 | Gosior |
| 2005/0078631 A1 | 4/2005 | Cornwall |
| 2005/0190784 A1 | 9/2005 | Stine |
| 2005/0249170 A1 | 11/2005 | Salokannel et al. |
| 2006/0025136 A1 * | 2/2006 | Fujita ............... H04W 74/0816 455/436 |
| 2006/0165031 A1 | 7/2006 | Wang et al. |
| 2006/0187866 A1 | 8/2006 | Werb |
| 2006/0245440 A1 | 11/2006 | Mizukoshi |
| 2006/0268746 A1 | 11/2006 | Wijting et al. |
| 2006/0274673 A1 | 12/2006 | Fleury |
| 2007/0014269 A1 | 1/2007 | Sherman et al. |
| 2007/0057812 A1 | 3/2007 | Cornwall |
| 2007/0091825 A1 | 4/2007 | Budampati et al. |
| 2007/0250212 A1 | 10/2007 | Halloran et al. |
| 2007/0286136 A1 | 12/2007 | Rittle et al. |
| 2007/0293221 A1 | 12/2007 | Hwang et al. |
| 2008/0043637 A1 | 2/2008 | Rahman |
| 2008/0086560 A1 | 4/2008 | Monier et al. |
| 2008/0240078 A1 | 10/2008 | Thubert |
| 2009/0201169 A1 | 8/2009 | D'Hont et al. |
| 2009/0268652 A1 | 10/2009 | Kneckt et al. |
| 2010/0007521 A1 | 1/2010 | Cornwall |
| 2010/0026517 A1 | 2/2010 | Cumeralto et al. |
| 2010/0085954 A1 | 4/2010 | Keshavarzian |
| 2010/0097988 A1 | 4/2010 | Chung |
| 2010/0195552 A1 | 8/2010 | Ho |
| 2010/0329232 A1 | 12/2010 | Tubb et al. |
| 2011/0004764 A1 | 1/2011 | Stuber |
| 2011/0018762 A1 | 1/2011 | Walley et al. |
| 2011/0066297 A1 | 3/2011 | Saberi |
| 2011/0140909 A1 | 6/2011 | Olson et al. |
| 2011/0152970 A1 | 6/2011 | Jollota |
| 2011/0317019 A1 | 12/2011 | Bahl et al. |
| 2012/0008536 A1 | 1/2012 | Tervahauta et al. |
| 2012/0026007 A1 | 2/2012 | Beattie |
| 2012/0115518 A1 | 5/2012 | Zeira |
| 2012/0140622 A1 | 6/2012 | Kruglick |
| 2012/0201231 A1 | 8/2012 | Omeni |
| 2013/0007231 A1 | 1/2013 | Forssell |
| 2013/0064159 A1 | 3/2013 | Edwards |
| 2013/0083722 A1 | 4/2013 | Bhargava et al. |
| 2013/0094537 A1 | 4/2013 | Hui et al. |
| 2013/0107772 A1 | 5/2013 | Splitz et al. |
| 2013/0107999 A1 | 5/2013 | Mainaud et al. |
| 2013/0109319 A1 | 5/2013 | Splitz et al. |
| 2013/0155925 A1 | 6/2013 | Priyantha et al. |
| 2013/0181848 A1 | 7/2013 | Picard |
| 2013/0285855 A1 | 10/2013 | Dupray |
| 2013/0336245 A1 | 12/2013 | Fischer |
| 2014/0028469 A1 | 1/2014 | Ali |
| 2014/0028470 A1 | 1/2014 | Ali |
| 2014/0044005 A1 | 2/2014 | Keys et al. |
| 2014/0086124 A1 | 3/2014 | Knowles |
| 2014/0120962 A1 | 5/2014 | Merlin |
| 2014/0314003 A1 | 10/2014 | Zhou |
| 2014/0329498 A1 | 11/2014 | Cherian et al. |
| 2015/0003227 A1 | 1/2015 | Splitz |
| 2015/0006633 A1 | 1/2015 | Vandwalle et al. |
| 2015/0081814 A1 | 3/2015 | Turakhia |
| 2015/0103818 A1 | 4/2015 | Kuhn |
| 2015/0124698 A1 | 5/2015 | Jain et al. |
| 2015/0223168 A1 | 8/2015 | Bhanage et al. |
| 2015/0257041 A1 | 9/2015 | Su |
| 2015/0382283 A1 | 12/2015 | Wang et al. |
| 2016/0050689 A1 | 2/2016 | Fischer |
| 2016/0066249 A1 | 3/2016 | Dukes |
| 2016/0080980 A1 | 3/2016 | Su |
| 2016/0192381 A1 | 6/2016 | Gao et al. |
| 2016/0218833 A1 | 7/2016 | Sapio et al. |
| 2016/0249378 A1 | 8/2016 | Zhou |
| 2016/0269971 A1 | 9/2016 | Kim et al. |
| 2016/0292469 A1 | 10/2016 | Ianni et al. |
| 2016/0373940 A1 | 12/2016 | Splitz |
| 2017/0048659 A1 | 2/2017 | Silvestri |
| 2017/0164307 A1 | 6/2017 | Zuniga et al. |
| 2017/0265153 A1 | 9/2017 | Grady et al. |
| 2017/0280450 A1 | 9/2017 | Jeong et al. |
| 2017/0303103 A1 | 10/2017 | Cullinan |
| 2017/0339016 A1 | 11/2017 | Splitz |
| 2018/0014248 A1 | 1/2018 | Splitz |
| 2018/0220354 A1 | 8/2018 | Heil |
| 2018/0310265 A1 | 10/2018 | Grady et al. |
| 2018/0317169 A1 | 11/2018 | Splitz et al. |
| 2019/0014393 A1 | 1/2019 | Splitz et al. |

(56) References Cited

U.S. PATENT DOCUMENTS

2019/0059116 A1* 2/2019 Crohas ............... H04B 17/318
2019/0226873 A1   7/2019 Magley et al.

FOREIGN PATENT DOCUMENTS

| WO | 2013062571 | 5/2013 |
|----|------------|--------|
| WO | 2013062613 | 5/2013 |
| WO | 2016036475 | 3/2016 |
| WO | 2018203922 | 11/2018 |

OTHER PUBLICATIONS

Splitz, David Edwin; Office Action for Canadian application No. 2,861,675, filed Mar. 25, 2014, dated Mar. 5, 2019, 4 pgs.
Magley, Dale McLeod; Issue Notification for U.S. Appl. No. 15/877,548, filed Jan. 23, 2018, dated Apr. 3, 2019, 1 pg.
Magley, Dale McLeod; Supplemental Notice of Allowance for U.S. Appl. No. 15/877,548, filed Jan. 23, 2018, dated Mar. 14, 2019, 6 pgs.
Splitz, David Edwin; Corrected Notice of Allowability for U.S. Appl. No. 14/490,081, filed Sep. 18, 2014, dated Jun. 26, 2018, 8 pgs.
ITRON; Brochure for ChoiceConnect, Copyright 2013, 4 pgs.
ITRON; Brochure for Radio Frequency Strategy in an AMI Deployment, Copyright 2012, 5 pgs.
Godwin, Angela; Article entitled: "Advanced Metering Infrastructure: Drivers and Benefits in the Water Industry", Waterworld, accessed on Mar. 30, 2016, 7 pgs.
Splitz, David Edwin; Issue Notification for U.S. Appl. No. 15/161,448, filed May 23, 2016, dated Sep. 19, 2018, 1 pg.
Splitz, David Edwin; Response to Amendment under Rule 312 for U.S. Appl. No. 15/161,448, filed May 23, 2016, dated Sep. 11, 2018, 6 pgs.
Splitz, David Edwin; Notice of Allowance for U.S. Appl. No. 15/161,448, filed May 23, 2016, dated May 23, 2018, 16 pgs.
Splitz, David Edwin; Issue Notification for U.S. Appl. No. 15/583,263, filed May 1, 2017, dated Dec. 19, 2018, 1 pg.
Splitz, David Edwin; Notice of Allowance for U.S. Appl. No. 15/583,263, filed May 1, 2017, dated Aug. 30, 2018, 13 pgs.
Splitz, David Edwin; Non-Final Office Action for U.S. Appl. No. 15/583,263, filed May 1, 2017, dated Mar. 8, 2018, 51 pgs.
Magley, Dale McLeod; Supplemental Notice of Allowability for U.S. Appl. No. 15/877,548, filed Jan. 23, 2018, dated Jan. 10, 2019, 7 pgs.
Magley, Dale McLeod; Notice of Allowance for U.S. Appl. No. 15/877,548, filed Jan. 23, 2018, dated Dec. 10, 2018, 10 pgs.
Magley, Dale McLeod; Non-Final Office Action for U.S. Appl. No. 15/877,548, filed Jan. 23, 2018, dated Jan. 23, 2018, 35 pgs.
Splitz, David Edwin; International Search Report for PCT Application No. PCT/US2017/050393, filed Sep. 7, 2017, dated Jan. 8, 2018, 14 pgs.
Splitz, David Edwin; Issue Notification for U.S. Appl. No. 13/283,526, filed Oct. 27, 2011, dated Feb. 5, 2014, 1 pg.
Splitz, David Edwin; Non-Final Office Action for U.S. Appl. No. 13/283,526, filed Oct. 27, 2011, dated Jun. 18, 2013, 67 pgs.
Splitz, David Edwin; Notice of Allowance for U.S. Appl. No. 13/283,526, filed Oct. 27, 2011, dated Oct. 9, 2013, 16 pgs.
Splitz, David Edwin; Non-Final Office Action for U.S. Appl. No. 15/161,448, filed May 23, 2016, dated Sep. 22, 2017, 16 pgs.
Splitz, David Edwin; Issue Notification for U.S. Appl. No. 13/339,655, filed Dec. 29, 2011, dated Sep. 17, 2014, 1 pg.
Splitz, David Edwin; Non-Final Office Action for U.S. Appl. No. 13/339,655, filed Dec. 29, 2011, dated Mar. 5, 2014, 18 pgs.
Splitz, David Edwin; Non-Final Office Action for U.S. Appl. No. 13/339,655, filed Dec. 29, 2011, dated Sep. 16, 2014, 18 pgs.
Splitz, David Edwin; Notice of Allowance for U.S. Appl. No. 13/339,655, filed Dec. 29, 2011, dated May 23, 2014, 41 pgs.
Splitz, David Edwin; Final Office Action for U.S. Appl. No. 14/490,081, filed Sep. 18, 2014, dated Jan. 11, 2017; 23 pgs.
Splitz, David Edwin; Issue Notification for U.S. Appl. No. 14/490,081, filed Sep. 19, 2014, dated Jul. 11, 2018, 1 pg.
Splitz, David Edwin; Non-Final Office Action for U.S. Appl. No. 14/490,081, filed Sep. 18, 2014; dated Sep. 29, 2016; 34 pgs.
Splitz, David Edwin; Notice of Allowance for U.S. Appl. No. 14/490,081, filed Sep. 18, 2014, dated Mar. 2, 2018, 26 pgs.
Dukes, Brent; Issue Notification for U.S. Appl. No. 14/475,050, filed Sep. 2, 2014, dated Jan. 18, 2017, 1 pg.
Dukes, Brent; Non-Final Office Action for U.S. Appl. No. 14/475,050, filed Sep. 2, 2014, dated May 19, 2016, 119 pgs.
Dukes, Brent; Notice of Allowability for U.S. Appl. No. 14/475,050, filed Sep. 2, 2014, dated Nov. 21, 2016, 33 pgs.
Dukes, Brent; Notice of Allowability for U.S. Appl. No. 14/475,050, filed Sep. 2, 2014, dated Dec. 15, 2016, 6 pgs.
Dukes, Brent; Notice of Allowance for U.S. Appl. No. 14/475,050, filed Sep. 2, 2014, dated Oct. 21, 2016, 15 pgs.
McCraven, Jeremy; Applicant Interview Summary for U.S. Appl. No. 14/273,823, filed May 9, 2014, dated Jan. 12, 2016, 3 pgs.
McCraven, Jeremy; Non-Final Office Action for U.S. Appl. No. 14/273,823, filed May 9, 2014, dated Dec. 8, 2015, 18 pgs.
McCraven, Jeremy; Non-Final Office Action for U.S. Appl. No. 14/273,823, filed May 9, 2014, dated Apr. 12, 2016, 86 pgs.
McCraven, Jeremy; Notice of Allowance for U.S. Appl. No. 14/273,823, filed May 9, 2014, dated Jul. 7, 2016, 10 pgs.
Cullinan, Thomas; Final Office Action for U.S. Appl. No. 15/098,986, filed Apr. 14, 2016, dated Jan. 25, 2018, 22 pgs.
Cullinan, Thomas; Final Office Action for U.S. Appl. No. 15/098,986, filed Apr. 14, 2016, dated Oct. 4, 2018, 27 pgs.
Cullinan, Thomas; Non-Final Office Action for U.S. Appl. No. 15/098,986, filed Apr. 14, 2016, dated Apr. 5, 2018, 11 pgs.
Cullinan, Thomas; Non-Final Office Action for U.S. Appl. No. 15/098,986, filed Apr. 14, 2016; dated Jul. 12, 2017; 23 pgs.
Grady, Robert Henry; Corrected Notice of Allowance for U.S. Appl. No. 15/065,423, filed Mar. 9, 2016, dated Aug. 9, 2018, 6 pgs.
Grady, Robert Henry; Issue Notification for U.S. Appl. No. 15/065,423, filed Mar. 9, 2016, dated Aug. 21, 2018, 1 pg.
Grady, Robert Henry; Non-Final Office Action for U.S. Appl. No. 15/065,423, filed Mar. 9, 2016, dated Nov. 28, 2017, 45 pgs.
Grady, Robert Henry; Notice of Allowance for U.S. Appl. No. 15/065,423, filed Mar. 9, 2016, dated Apr. 12, 2018, 15 pgs.
Splitz, David; International Preliminary Report on Patentability for serial No. PCT/US11/58260, filed Oct. 28, 2011, dated May 8, 2014, 7 pgs.
Splitz, David; International Search Report and Written Opinion for serial No. PCT/US11/58260, filed Oct. 28, 2011, dated Feb. 7, 2012, 8 pgs.
Splitz, David Edwin; Office Action for Canadian application No. 2,861,675, filed Mar. 25, 2014, dated Apr. 12, 2018, 4 pgs.
Splitz, David Edwin; Office Action for Canadian Patent Application No. 2,861,675, filed Oct. 28, 2011, dated Aug. 22, 2017, 4 pgs.
Splitz, David; International Preliminary Report on Patentability for serial No. PCT/US12/22060, filed Jan. 20, 2012, dated May 8, 2014, 6 pgs.
Splitz, David; International Search Report and Written Opinion for serial No. PCT/US12/22060, filed Jan. 20, 2012, dated Mar. 29, 2012, 8 pgs.
Splitz, David Edwin; Office Action for Canadian patent application No. 2,850,059, filed Mar. 25, 2014, dated Oct. 31, 2017, 3 pgs.
Splitz, David Edwin; Office Action for Canadian patent application No. 2,850,059, filed Mar. 25, 2014, dated Dec. 13, 2018, 4 pgs.
Splitz, David Edwin; Office Action for Canadian patent application No. 2,850,059, filed Mar. 25, 2014, dated Apr. 23, 2018, 3 pgs.
Splitz, David Edwin; Extended European Search Report for serial No. 12844451.0, filed Jan. 20, 2012, dated Apr. 21, 2015, 8 pgs.
Dukes, Brent; International Preliminary Report on Patentability for PCT application No. PCT/US15/44140, filed Aug. 7, 2015, dated Mar. 16, 2017, 12 pgs.
Dukes, Brent; International Search Report and Written Opinion for application No. PCT/US15/44140, filed Aug. 7, 2015, dated Dec. 30, 2015, 15 pgs.
Splitz, David Edwin; U.S. Provisional Patent Application entitled: Automatic Discovery of Nodes in a Mesh Network, U.S. Appl. No. 61/779,896, filed Mar. 13, 2013; 110 pgs.

(56) References Cited

OTHER PUBLICATIONS

Berg et al., Spread Spectrum in Mobile Communication, 1998, The Institution of Electrical Engineers, ISBN 085296935X, pp. 42-132 (Year 1998).
Splitz, David Edwin; Corrected Notice of Allowance for U.S. Appl. No. 15/206,851, filed Jul. 11, 2016, dated Jan. 4, 2019, 9 pgs.
Splitz, David Edwin; Corrected Notice of Allowance for U.S. Appl. No. 15/206,851, filed Jul. 11, 2016, dated Oct. 17, 2018, 13 pgs.
Splitz, David Edwin; Final Office Action for U.S. Appl. No. 15/206,851, filed Jul. 11, 2016, dated Jul. 20, 2018, 25 pgs.
Splitz, David Edwin; Issue Notification for U.S. Appl. No. 15/206,851, filed Jul. 11, 2016, dated Jan. 16, 2019, 1 pg.
Splitz, David Edwin; Non-Final Office Action for U.S. Appl. No. 15/206,851, filed Jul. 11, 2016, dated Feb. 7, 2018, 53 pgs.
Splitz, David Edwin; Notice of Allowance for U.S. Appl. No. 15/206,851, filed Jul. 11, 2016, dated Sep. 20, 2018, 9 pgs.
Splitz, David Edwin; Final Office Action for U.S. Appl. No. 15/161,448, filed May 23, 2016, dated Mar. 15, 2018, 16 pgs.
Dec. 13, 2018, Splitz, David Edwin; Office Action for Canadian patent application No. 2,850,059, filed Mar. 25, 2014, dated Dec. 13, 2018, 4 pgs.
Dec. 19, 2018, Splitz, David Edwin; Issue Notification for U.S. Appl. No. 15/583,263, filed May 1, 2017, dated Dec. 19, 2018, 1 pg.
Jan. 10, 2019, Magley, Dale McLeod; Supplemental Notice of Allowability for U.S. Appl. No. 15/877,548, filed Jan. 23, 2018, dated Jan. 10, 2019, 7 pgs.
Cullinan; Thomas; Notice of Allowance for U.S. Appl. No. 15/098,986, filed Apr. 14, 2016, dated Sep. 18, 2019, 16 pgs.
Grady, Robert Henry; Non-Final Office Action for U.S. Appl. No. 16/021,581, filed Jun. 28, 2018, dated Jul. 12, 2019, 50 pgs.
Grady, Robert Henry; Notice of Allowance for U.S. Appl. No. 16/021,581, filed Jun. 28, 2018, dated Oct. 3, 2019, 8 pgs.
Splitz, David Edwin; Non-Final Office Action for U.S. Appl. No. 16/111,325, filed Aug. 24, 2018, dated Aug. 15, 2019, 45 pgs.
Magley, Dale McLeod; Non-Final Office Action for U.S. Appl. No. 16/149,242, filed Oct. 2, 2018, dated Aug. 7, 2019, 46 pgs.
Cullinan, Thomas; Corrected Notice of Allowance for U.S. Appl. No. 15/098,986, filed Apr. 14, 2016, dated Nov. 22, 2019, 10 pgs.
Cullinan, Thomas; Supplemental Notice of Allowance for U.S. Appl. No. 15/098,986, filed Apr. 14, 2016, dated Oct. 25, 2019, 7 pgs.
Grady, Robert Henry; Corrected Notice of Allowance for U.S. Appl. No. 16/021,581, filed Jun. 28, 2018, dated Nov. 12, 2019, 7 pgs.
Grady, Robert Henry; Corrected Notice of Allowance for U.S. Appl. No. 16/021,581, filed Jun. 28, 2018, dated Dec. 26, 2019, 6 pgs.
Splitz, David Edwin; Office Action for Canadian application No. 2,850,059, filed Jan. 20, 2012, dated Nov. 5, 2019, 3 pgs.
Splitz, David Edwin; Notice of Allowance for U.S. Appl. No. 16/11,235, filed Aug. 24, 2018, dated Dec. 26, 2019, 12 pgs.
Magley, Dale McLeod; Final Office Action for U.S. Appl. No. 16/149,242, filed Oct. 2, 2018, dated Dec. 16, 2019, 38 pgs.
Splitz, David Edwin; International Preliminary Report on Patentability for PCT Application No. PCT/US2017/050393, filed Sep. 7, 2017, dated Nov. 14, 2019, 11 pgs.
Cullinan, Thomas; Corrected Notice of Allowance for U.S. Appl. No. 15/098,986, filed Apr. 14, 2016, dated Jan. 28, 2020, 9 pgs.
Grady, Robert Henry; Corrected Notice of Allowance for U.S. Appl. No. 16/021,581, filed Jun. 28, 2018, dated Jan. 29, 2020, 10 pgs.
Magley, Dale McLeod; Non-Final Office Action for U.S. Appl. No. 16/149,242, filed Oct. 2, 2018, dated Feb. 10, 2020, 37 pgs.

* cited by examiner

ASYMMETRICAL HAIL TIMING

CROSS REFERENCE TO RELATED APPLICATION

This application is a continuation of U.S. application Ser. No. 15/206,851, filed Jul. 11, 2016, which is hereby incorporated by reference herein in its entirety.

TECHNICAL FIELD

This disclosure relates to socio-technical networks. More specifically, this disclosure relates to data communications between radio frequency devices in a utility network.

BACKGROUND

A utility provider, such as a gas, electricity, or water provider, may have a large number of control, measuring, and sensing devices installed in the field in order to control transmission and distribution of the product, measure, and record product usage, and detect problems. Such devices may include water, gas, or electrical meters, remotely controlled valves, flow sensors, leak detection devices, and the like. Utility meters may include wireless communication capability to send and receive wireless communications with a remote communication device, enabling remote reading of meters.

Advanced Metering Infrastructure (AMI), Automatic Meter Reading (AMR), and Advanced Metering Management (AMM) are systems that measure, collect, and analyze utility data using advanced metering devices such as water meters, gas meters, and electricity meters. The advanced metering devices combine internal data measurements with continuously available remote communications, enabling the metering devices to transmit and receive data through the AMI, AMR, and/or AMM network.

A typical AMI network may include thousands of devices called "nodes." A "node" as used herein may refer to either a composite device in a network capable of performing a specific function or a communication module connected to such a device and configured to provide communications for the device. The AMI network also includes a device known as a repeater, which receives a signal from a central network device, such as a hub, and that regenerates the signal for distribution to other network devices. Nodes and some repeaters are powered by batteries (DC power), while other repeaters are AC powered. Because of the remote placement nature of the nodes and associated devices, it is desirable to maximize a battery life of the nodes and associated devices in order to reduce down time and to reduce the amount of maintenance that must be performed on the nodes. While the battery powering a repeater is frequently more powerful than that of a node, maximizing battery life in a DC repeater is likewise desirable.

One way to maximize battery life of a node and of a repeater powered by direct current (DC) is to only intermittently "listen" for a hailing communication from another network device, whereby the receiving device may only be powered on (i.e., "awake") for around three milliseconds (ms) to detect whether any hail messages are being sent over alternating hailing channels, and if not, to power off (i.e., "sleep") for a predesignated time, such as three seconds. This waking-sleeping sequence alternately repeats, with the waking moments called "sniffs" and the interval between sniffs (in this example, the three seconds) known as a "sniffing window." The receiving device has a channel activity detector (CAD) which, during a sniff, can quickly (in 2-3 ms) assess whether any RF energy exists in the alternating channels that matches a preamble transmission profile. A preamble represents a sequence of symbols that may be repeated at the start of a data message, including a hailing message. The preamble portion of a hail message may have a duration of 160 ms, and the data portion of the message may have a duration of 20 ms. Each hail message is followed by a period of about 22 ms where the hailing device waits to receive the start of an acknowledgement (ACK) signal from the receiving device. If the start of the ACK signal is detected during the 22 ms period, then the hailing device waits to receive the entire ACK signal (which may be longer than 22 ms). Otherwise, without such detection, the hailing device either sends another hail or goes to sleep, depending on whether any predetermined limit on hailing attempts has been reached. During the sniffing window, the hail message is repeated over two or more alternating hail channels. Advantageously, if a sniff does not result in preamble detection of a hail message being transmitted due to the sniff not occurring during transmission of a valid segment of the preamble portion, the next sniff will align with a valid segment of the preamble portion of a later-occurring repeated hail message.

When attempting to hail a node given the above time parameters, if a preamble is not detected by the very first sniff occurring during transmission of a pattern of repeated hail messages, then the hail message will repeat almost 14 times during the three-second sniffing window before the next sniff achieves preamble detection. Additionally, during each hail message, the transmitting device is in a transmission mode approximately 89% of the time (i.e., 1−(22/202)=1−0.1089≈0.89). Thus, although listening only once every 3 seconds is an effective way to save power of the listening device, more burden is placed on the hailing device, which has to use more energy to try to successfully hail the receiving device.

A battery by itself cannot supply sufficient current to power communications between a hailing device and a receiving device; it can output only a small amount of energy for long periods of time. However, when a battery is coupled to a companion device, such as a particular type of capacitor charged by the battery, an AMI device can output sufficient energy for communicating, though for a comparatively shorter period of time. The companion device used for powering communications according to the parameters described above was a Hybrid Layered Capacitor (HLC), which can supply energy for a long time, at a minimum, for the 3-second sniffing window described above. However, HLCs employ proprietary technology and are expensive. Additionally, finding an adequate supply of HLCs has proven difficult.

To overcome these problems, an Electrolytic Double Layer Capacitor (EDLC), also known in the trade as a "super capacitor," can be used instead of an HLC. Like an HLC, an EDLC can output a sufficient amount of energy to support communications. However, the period of time during which the EDLC can sustain that energy output is much shorter than that for the HLC, specifically, only about 1.5 seconds, as compared with the minimum 3 seconds for the HLC (i.e., entire sniffing window duration). Furthermore, although large EDLCs can supply greater energy than smaller ones, large EDLCs are more susceptible to leakage current, which reduces overall battery life. Hailing a listening device in the manner described above with an EDLC is therefore not feasible. Thus it has become necessary to derive a means of successfully hailing a listening device in an AMI network, such as a DC repeater, that overcomes the foregoing drawbacks.

SUMMARY

Disclosed is a method of communicating hail messages, comprising repeatedly transmitting first hail messages from a first device at a first hailing rate, wherein a first time between beginnings of each consecutive first hail message is a first period, each first hail message transmitted for a first length of time, and a first gap extends between an end of each first hail message and a start of a next first hail message; listening at the first device for a second hail message being repeatedly transmitted to the first device at a second hailing rate, wherein a second time between beginnings of each consecutive second hail message is a second period, each second hail message transmitted for a second length of time, and a second gap extends between an end of each second hail message and a start of a next second hail message; and performing, at the first device, a channel activity detection of a preamble in the second hail message. The first period is greater than the second period, the first length of time is greater than the second length of time, and the first gap is greater than the second gap. Also, the first device listens for the second hail message at a first listening rate that is less than a second listening rate of a second device.

In another aspect of the current disclosure, a node comprises a processor and logic processed by the processor to repeatedly transmit first hail messages from the node at a first hailing rate, wherein a first time between beginnings of each consecutive first hail message is a first period, and a first gap extends between an end of each first hail message and a start of a next first hail message, transmit each first hail message for a first length of time, listen for a second hail message being repeatedly transmitted to the node at a second hailing rate, wherein a second time between beginnings of each consecutive second hail message is a second period, each second hail message transmitted for a second length of time, and a second gap extends between an end of each second hail message and a start of a next second hail message, and perform a channel activity detection of a preamble in the second hail message, wherein the first period is greater than the second period, the first length of time is greater than the second length of time, and the first gap is greater than the second gap, and wherein the logic is processed by the processor to listen for the second hail message at a first listening rate that is less than a second listening rate of a network device.

In yet another aspect of the current disclosure, the first device can hail the second device at the second hailing rate, and the second device can hail the first device at the first hailing rate. For certain locations in a network, both the first device and the second device may hail one another using the first hailing rate, or they may both hail one another using the second hailing rate.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
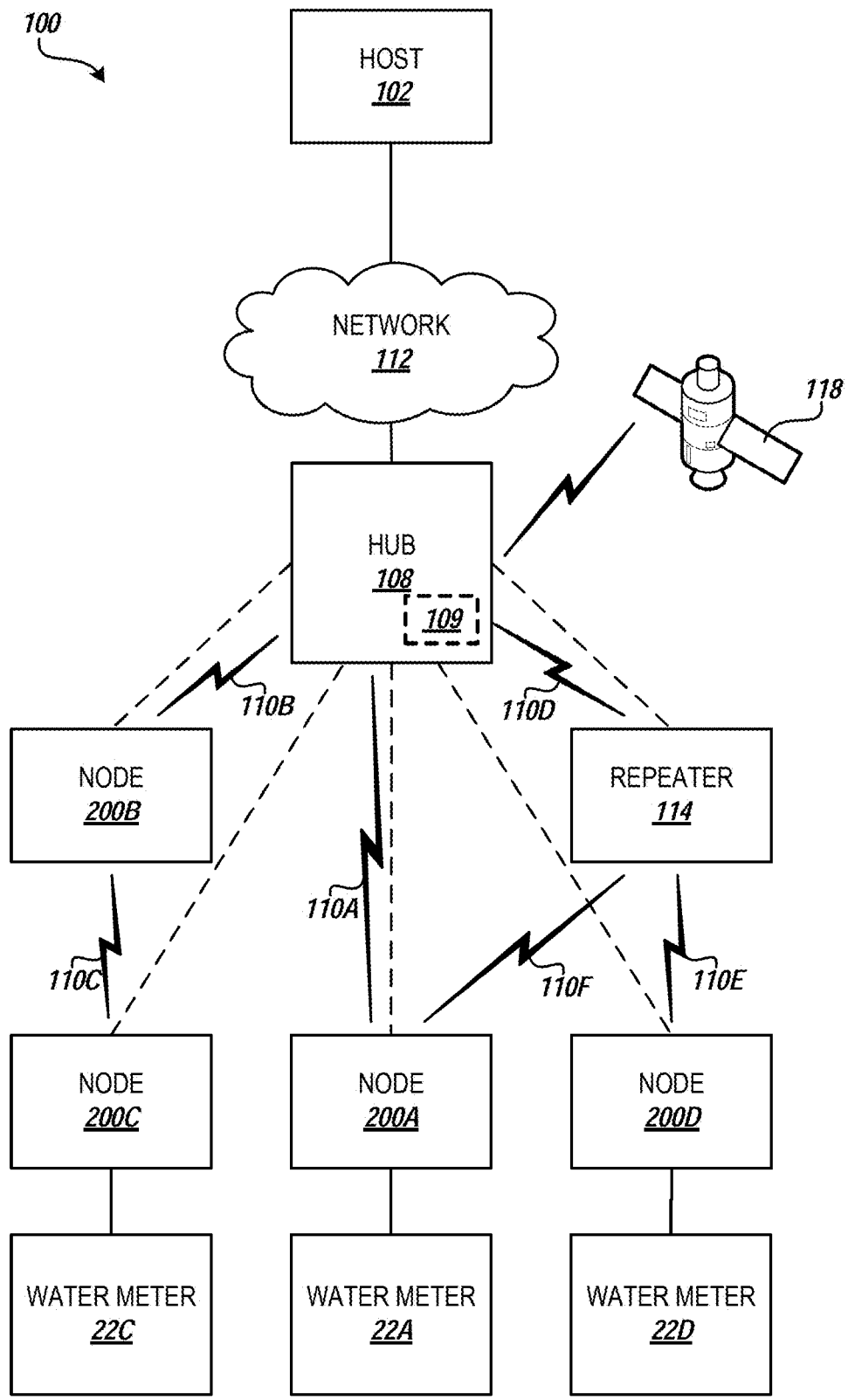
FIG. 1 is a block diagram showing one example of an AMI network topology, according to embodiments described herein.

The present disclosure can be understood more readily by reference to the following detailed description, examples, drawing, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching in its best, currently known embodiments. To this end, those skilled in the relevant art will recognize and appreciate that many changes can be made to the various disclosed aspects described herein, while still obtaining the beneficial results of the present disclosure. It will also be apparent that some of the desired benefits can be obtained by selecting some of the features without utilizing or including other features. Accordingly, those who work in the art will recognize that many modifications and adaptations are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "a panel" can include two or more such panels unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X on a particular measurement scale measures within a range between X plus and industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

In one aspect, disclosed is a method of communicating hail messages, comprising the steps of repeatedly transmitting first hail messages from a first device at a first hailing rate in which time between beginnings of each consecutive first hail message is a first period, a length of time each first hail message is transmitted is a first length, and a first quantity of time extending between an end of each first hail message and a start of a next first hail message is a first gap; and listening at the first device for a second hail message being repeatedly transmitted to the first device at a second hailing rate in which time between beginnings of each consecutive second hail message is a second period, a length of time each second hail message is transmitted is a second length, and a second quantity of time extending between an end of each second hail message and a start of a next second hail message is a second gap. The first period is greater than the second period, the first length is greater than the second length, and the first gap is greater than the second gap. Also, the first device listens for the second hail message at a first listening rate that is less than a second listening rate of a second device. It would be understood by one of skill in the art that the disclosed method and node are described in but a few exemplary embodiments among many. No particular terminology or description should be considered limiting on the disclosure or the scope of any claims issuing therefrom.

In another aspect of the current disclosure, a node comprises a processor and logic processed by the processor to repeatedly transmit first hail messages from the node at a first hailing rate in which time between beginnings of each consecutive first hail message is a first period, a length of time each first hail message is transmitted is a first length, and a first quantity of time extending between an end of each first hail message and a start of a next first hail message is a first gap; and to listen for a second hail message being repeatedly transmitted to the node at a second hailing rate in which time between beginnings of each consecutive second hail message is a second period, a length of time each second hail message is transmitted is a second length, and a second quantity of time extending between an end of each second hail message and a start of a next second hail message is a second gap. The first period is greater than the second period, the first length is greater than the second length, and the first gap is greater than the second gap. Also, the logic is processed by the processor to listen for the second hail message at a first listening rate that is less than a second listening rate of a network device.

FIG. 1 is a block diagram showing one example of a network topology of an illustrative fixed AMI system 100, such as that implemented by a utility provider. The AMI system 100 may include utility provider systems, such as host 102. The host 102 may represent a combination of application servers, database servers, communication servers, web servers, and the like that comprise the systems of the utility provider used to collect data from, control, and manage the various nodes 200A-200D (referred to herein generally as nodes 200) in the AMI system 100. For example, as shown in FIG. 1, nodes 200C,200A,200D may be respectively connected to water meters 22C,22A,22D and provide AMI network communication for those meters.

According to various embodiments, the host 102 may communicate with the nodes 200 through one or more stationary collection hubs 108. The stationary, or fixed, collection hubs 108 may comprise specialized network nodes installed in the field that act as a "parent node" for a set of assigned child nodes 200A-200D that communicate with the hub through various communication links 110A-110E (referred to herein generally as communication links 110). The communication links 110 may include wireless communication links, such as RF communication links. Owing to a stationary transceiver 109 housed in each hub 108, the communication across the communication links 110 is two-way. The collection hubs 108 may periodically collect usage data, sensor data, and other data from the child nodes 200 and forward data to the host 102 over a network 112. The collection hubs 108 may also forward messages received from the host 102 over the network 112 to the target child node(s) 200. The network 112 may comprise various networking technologies that connect the collection hubs 108 in the field to the host 102, including cellular data networks, W-Fi or WMAX networks, satellite communication networks, metropolitan-area networks ("MANs"), wide-area networks ("WANs"), the Internet, and the like.

The collection hub 108 may communicate with its child nodes 200A-200D either directly or through one or more intermediary devices. For example, the AMI system 100 may include repeaters 114 that facilitate communication between the collection hub 108 and remote nodes, such as node 200D. According to further embodiments, some nodes may be configured to act as repeaters, referred to herein as "buddy nodes," such as node 200B shown in FIG. 1. It will be appreciated that some nodes in the AMI system 100, such as node 200A, may be located such that it receives messages from the collection hub 108 both directly and by way of one or more repeaters 114 or buddy nodes 200.

According to embodiments, the collection hubs 108 may include or be connected to an accurate time source 118. For example, a collection hub 108 may be GPS-enabled and able to receive a highly accurate time value from a GPS receiver. Other accurate time sources 118 may include a cellular network connection, an integrated accurate real-time clock component, and the like. Because collection hubs 108 may be connected to fixed power sources, these devices may be able to maintain accurate current time without the need for reduced power consumption required by other, remote nodes 104. It will be appreciated that the configuration of the network comprising the AMI system shown in FIG. 1 and described above is merely one configuration, and additional devices and/or alternative configurations may be conceived by one skilled in the art. As such, the network topology shown in FIG. 1 and the network configurations described should not be seen as limiting but, instead, as merely exemplary.

The communication links shown in FIG. 1 represent a network or networks that may comprise hardware components and computers interconnected by communications channels that enable sharing of resources and information. The network may comprise one or more of a wired, wireless, fiber optic, or remote connection via a telecommunication link, an infrared link, a radio frequency link, a cellular link, a Bluetooth® link, or any other suitable connectors or systems that provide electronic communication. The network may comprise intermediate proxies, routers, switches, load balancers, and the like. The paths followed by the network between the devices as depicted in FIG. 1 represent the logical communication links between nodes (such as 200B and 200C), between a node 200 and the hub 108, or between nodes 200 and the repeater 114, not necessarily the physical paths or links between and among the devices.

Figure 2:
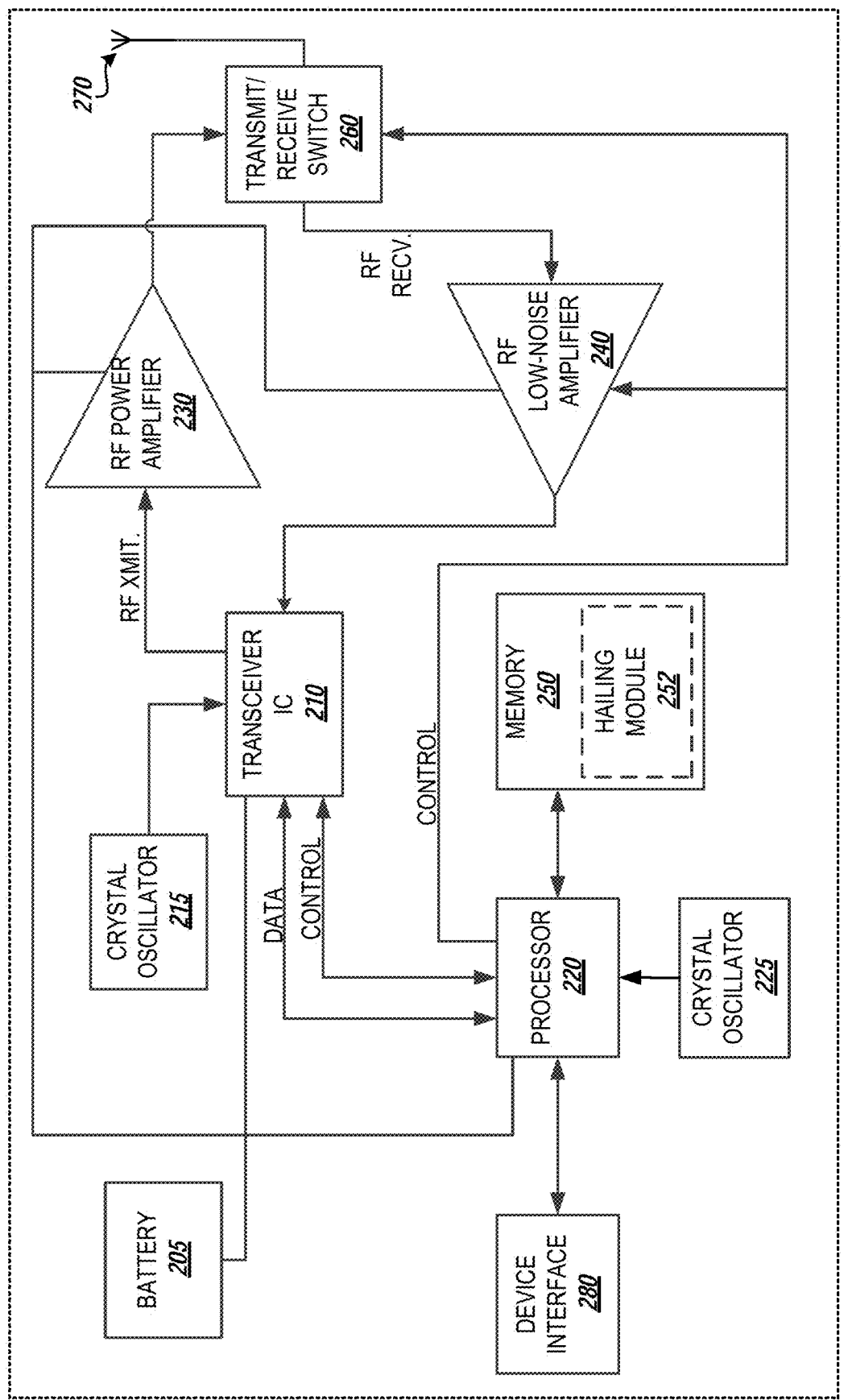
FIG. 2 is a block diagram of a node according to certain embodiments described herein.

FIG. 2 shows a block diagram of components of an illustrative node 200 configured for RF communication in AMI (as well as AMR) networks. The node 200 may allow data to and from devices in the AMI system 100, such as water, gas, or electrical meters, remotely controlled valves, flow sensors, leak detection devices, collection hubs 108, repeaters 114, and the like, to be communicated over the wireless AMI network. For example, the node 200 may be implemented in or connected to a water meter in order to transmit audio recording data to the host 102 for leak detection, as described above in regard to FIG. 2. According to various embodiments, the node 200 may be configured for communication on various radio network topologies, including star, hybrid-star, peer-to-peer, mesh, and the like.

The node 200 may include a battery 205 that powers a transceiver integrated circuit ("IC") 210, a processor 220, an RF power amplifier 230, an RF low-noise amplifier 240, a memory 250, and other components. Crystal oscillators 215 and 225 are connected to the transceiver IC 210 and the processor 220, respectively. The node 200 further includes a transmit/receive switch 260 and antenna 270. The processor 220 may be a microprocessor, a microcontroller, a field-programmable gate array ("FPGA"), or the like. The processor 220 and the transceiver IC 210 may include both a two-way data and a two-way control line. In some embodiments, the processor 220 includes a control line to each of the RF low-noise amplifier 240 and the transmit/receive switch 260. The processor 220 may also be connected to the memory 250 by a two-way data line.

The memory 250 may comprise a processor-readable storage medium for storing processor-executable instructions, data structures and other information. The memory 250 may include a non-volatile memory, such as read-only memory ("ROM") and/or FLASH memory, and a random-access memory ("RAM"), such as dynamic random access memory ("DRAM") or synchronous dynamic random access memory ("SDRAM"). The memory 250 may store firmware that comprises commands and data necessary for the nodes 200, collection hubs 108, and repeaters 114 to communicate with other devices in the AMI system 100 as well as perform other operations of the nodes. According to some embodiments, the memory 250 may store a hailing module 252 comprising processor-executable instructions that, when executed by the processor 220, perform at least portions of the methods 800, 900, 1000, and 1100 (FIGS. 8-11) for controlling how a node and a DC repeater hail one another and how they both listen for and process communications.

In addition to the memory 250, the node 200 may have access to other processor-readable media storing program modules, data structures, and other data described herein for accomplishing the described functions. It will be appreciated by those skilled in the art that processor-readable media can be any available media that may be accessed by the processor 220 or other computing system, including processor-readable storage media and communications media. Communications media includes transitory signals. Processor-readable storage media includes volatile and non-volatile, removable and non-removable storage media implemented in any method or technology for the non-transitory storage of information. For example, processor-readable storage media includes, but is not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

According to embodiments, the processor 220 may be further connected to other components of the node 200 through a device interface 280. In some embodiments, the device interface 280 may connect to a metering component, such as a water, gas, or electricity meter, that allows the meter to provide usage data to the host 102 through the AMI system 100. In further embodiments, the device interface 280 may connect to sensors or detection components, such as the water meters 22A-22C described above. In still further embodiments, the device interface 280 may connect to a control component, such as an electronically actuated water valve, that allows the host 102 and/or other devices in the AMI system 100 to control aspects of the utility provider's infrastructure. These examples are not meant to be limiting, and those of skill in the art will recognize that alternative device components that may be interfaced with the node 200 through the device interface 280. For example, the device interface 280 may connect to a control component (valve actuator) and a data reading port (water meter readings) at the same time.

It will be appreciated that the structure and/or functionality of the node 200 may be different than that illustrated in FIG. 2 and described herein. For example, the transceiver IC 210, processor 220, RF power amplifier 230, RF low-noise amplifier 240, memory 250, crystal oscillators 215, 225, device interface 280 and other components and circuitry of the node 200 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the node 200 may not include all of the components shown in FIG. 2, may include other components that are not explicitly shown in FIG. 2 or may utilize an architecture completely different than that shown in FIG. 2.

For purposes of the present disclosure, repeater 114 will be henceforth referred to as "DC repeater 114," since a DC repeater is the repeater type relevant to one implementation of the present disclosure. However, it will be understood that repeaters can be either AC-powered or DC-powered, and that the same principles disclosed herein for conserving DC power in a repeater could also be applied to conserve AC power in a repeater.

Figure 3:
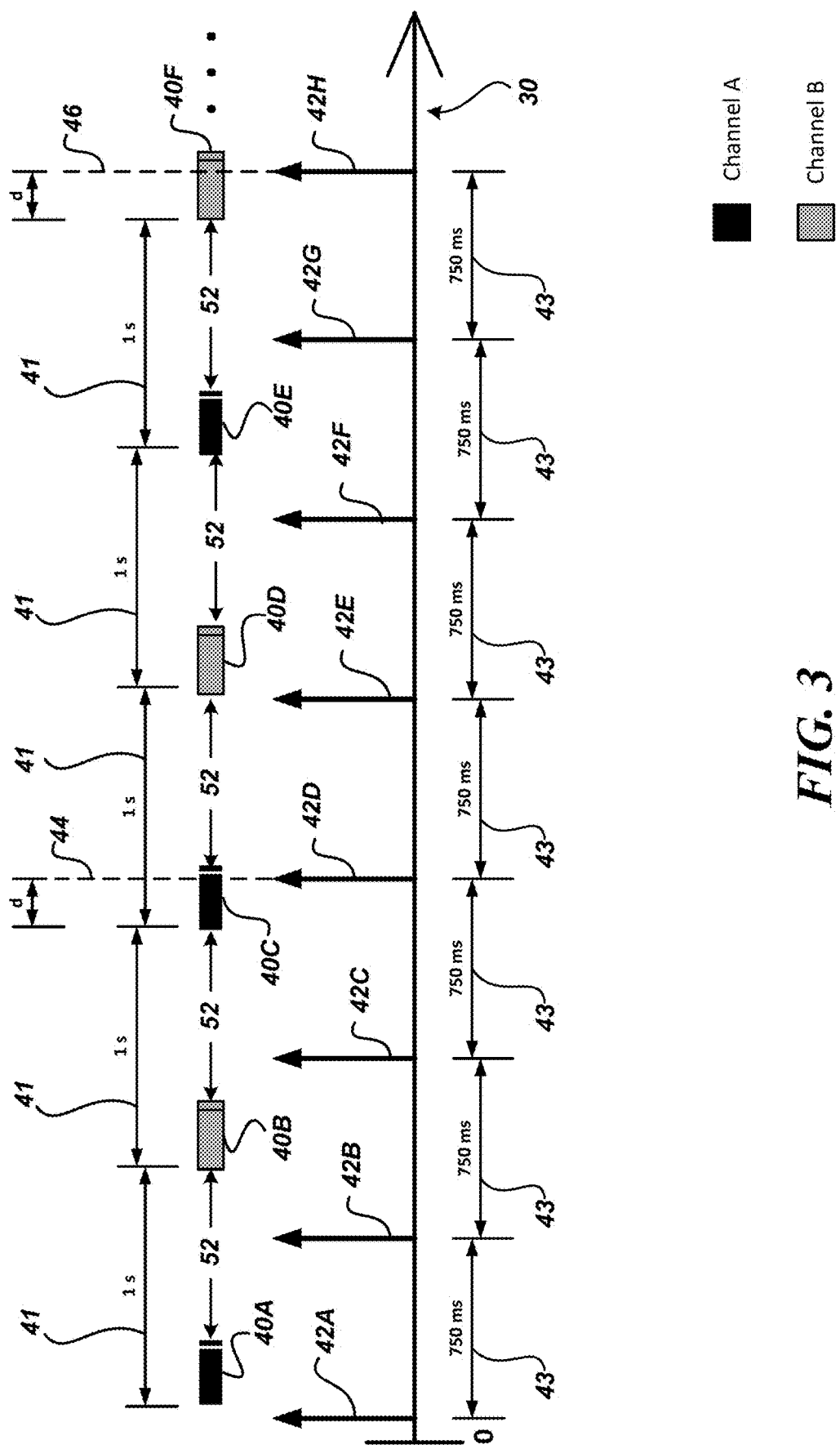
FIG. 3 is a timing diagram showing example timing of periodic listening by a DC repeater for a communication in relation to hail messages sent by another network device.
Figure 4:
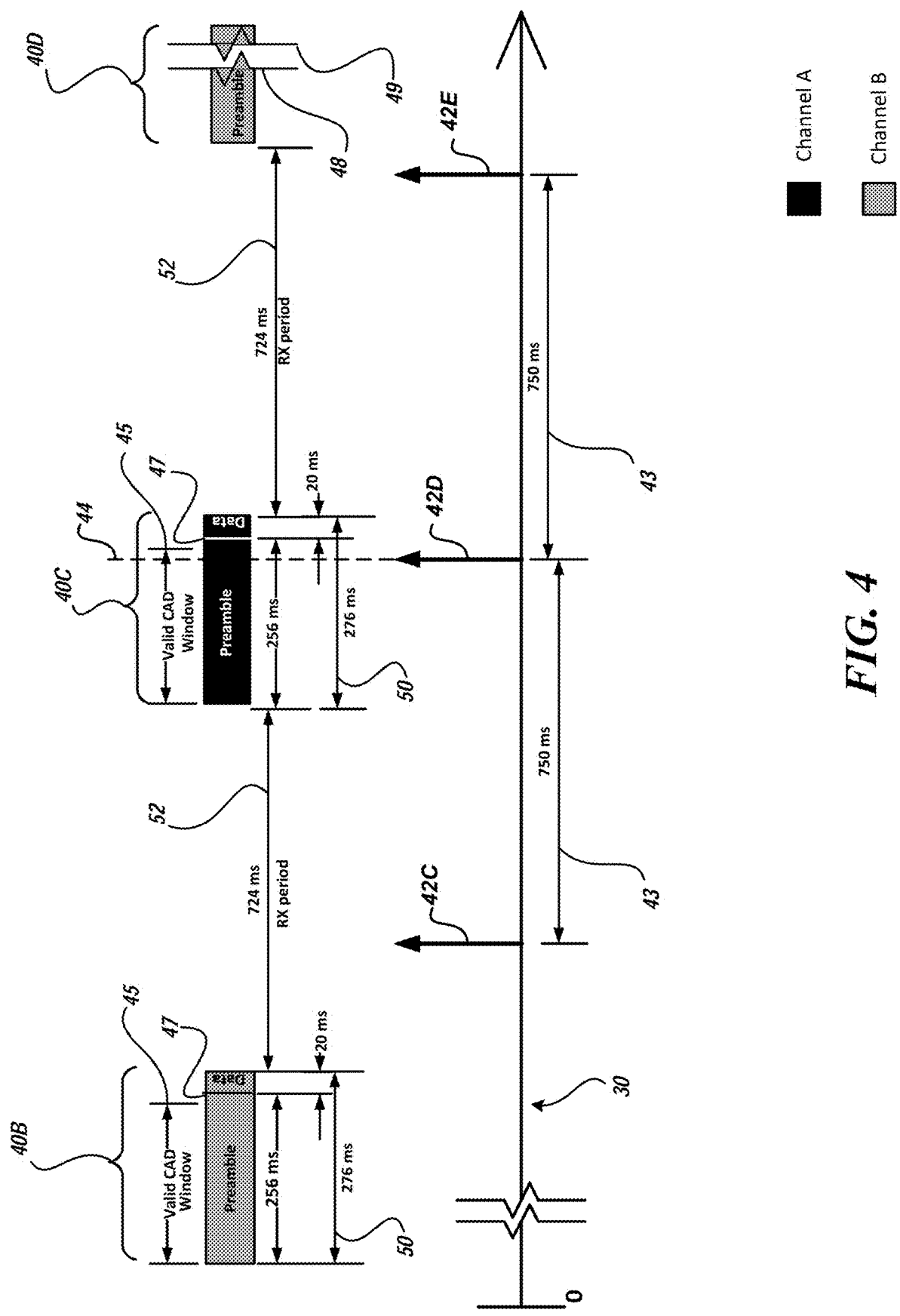
FIG. 4 is an enlargement of a portion of the timing diagram illustrated in FIG. 3, detailing dimensions of lengths of time of the hail messages as well as of the spacing between them.

FIGS. 3 and 4 together show timing relationships associated with the hailing of a DC repeater (such as DC repeater 114 of FIG. 1) by a hailing device (such as a node 200 of FIG. 1). Repeated hail messages 40A-40F (collectively, hail messages 40) sent from the hailing device and intended for the DC repeater 114 are shown appearing above instances of listening 42A-42H (collectively, listening instances 42) by the DC repeater 114. Consecutive listening instances 42 are each separated by a period (also called a "sniffing window") that, in one implementation, is about 750 milliseconds (ms) long. Hail messages 40 have a period 41 of about 1 second, measured between beginnings of each consecutive hail message 40. Gap lengths of time 52, measured after each hail message 40 is transmitted until a next hail message 40 is transmitted, can be about 724 ms in one implementation, as best seen in FIG. 4. Gap lengths of time 52 occur where the hailing device (such as node 200) waits to detect the start of an acknowledgement ("ACK signal") from the DC repeater 114 on a frequency-hopping, spread-spectrum (FHSS) channel referenced in the hail message 40. If the start of the ACK signal is detected during the 22 ms period, then the hailing device waits to receive the entire ACK signal (which may be longer than 22 ms). Otherwise, without such detection, the hailing device either sends another hail or goes to sleep, depending on whether any predetermined limit on hailing attempts has been reached. In examples, the hail messages 40 are sent alternating between two hailing channels of the DC repeater 114. As shown in FIG. 3, hail messages 40A, 40C, and 40E are sent on Channel "A," and hail messages 40B, 40D, and 40F are sent on Channel "B." In other implementations, there may only be one hailing channel and in still other implementations, there may be more than 2 hailing channels, in which case the alternating would simply rotate through all hailing channels successively.

FIG. 4 indicates which portions of each hail message 40 are valid and invalid, for purposes of being able to detect a preamble portion of a hail message, i.e., perform a Channel Activity Detection (abbreviated "CAD"). The DC repeater 114, as well as a receiving node 200 (FIG.1) can only detect a hail message during the preamble period except for the last few milliseconds thereof, as shown in FIG. 4. Detection of a hail message 40 cannot occur when the hailing device is transmitting data or when it is waiting for the acknowledgement signal from the DC repeater 114. Thus, a CAD cannot be successfully performed during either a gap length of time 52 or during any portion of a hail message 40 outside the "Valid CAD Window." Line segment 45 is intended to show that, in one implementation, a CAD will not be successful for the last five (5) preamble symbols appearing within the 256 ms preamble period of a hail message 40, since usually detection of at least six (6) preamble symbols is required for CAD completion. A start frame 47 separates the preamble portion of a hail message from the data portion. The start frame 47 indicates that the next matter to be transmitted is going to be data and not preamble symbols. Each hail message 40 may include, in one implementation, approximately 256 ms of preamble and 20 ms of data, for a hail message length of time 50 of approximately 276 ms. Hail message length of time 50 is therefore about 1.5 times the hail message length of time of each hail message sent to a node, as discussed herein with regard to FIG. 7. The rate at which hail messages 40 are sent is asynchronous with respect to the DC repeater listening rate of once every 750 ms (FIGS. 3 and 4), meaning that the timing at which hail messages 40 are sent is independent of the timing of the listening instances 42. Also, from the foregoing timing relationships, during transmission of each hail message 40, the hailing device (such as a node 200 of FIG. 1) is in a transmitting mode for a transmission percentage of about 28% (276 ms / 1000 ms) of the period 41.

Referring again to FIG. 3, in one implementation, a successful CAD is to be expected within three (3) hail attempts, and is represented by the first CAD alignment line 44 extending from the tip of listening instance 42D through the preamble portion of hail message 40C at a short distance behind the line segment representing the start frame 47 (FIG. 4) of hail message 40C. FIG. 3 also shows that, in a worst-case scenario, such as when Channel A (the channel of hail message 40C) is not functioning properly, a successful CAD can be reached by the sixth hail message 40F (in Channel B), at the very latest. That successful CAD is represented by the second CAD alignment line 46 extending from the tip of listening instance 42H through the preamble portion of hail message 40F, also at a short distance behind the start frame 47 (FIG. 4) of hail message 40F. In fact, the distance "d" that the first CAD alignment line 44 is spaced from the beginning of hail message 40C, and the distance "d" that the second CAD alignment line 46 is spaced from the beginning of hail message 40F, are of identical magnitude. This demonstrates that the first CAD will align at a point along the preamble portion of one of the first three (3) hail messages, at one of the two alternating channels, and that the next CAD will align at a congruent point along the preamble portion of the third hail message occurring after the first hail message in which a CAD aligned, at the other of the two alternating channels. The CAD alignment at hail messages 40C and 40F is provided as a single example, and can similarly occur at any pair of suitably-spaced hail messages 40 among hail messages 40A-40F. This congruence of CAD occurrences is further visualized in FIG. 5, discussed below.

Figure 5:
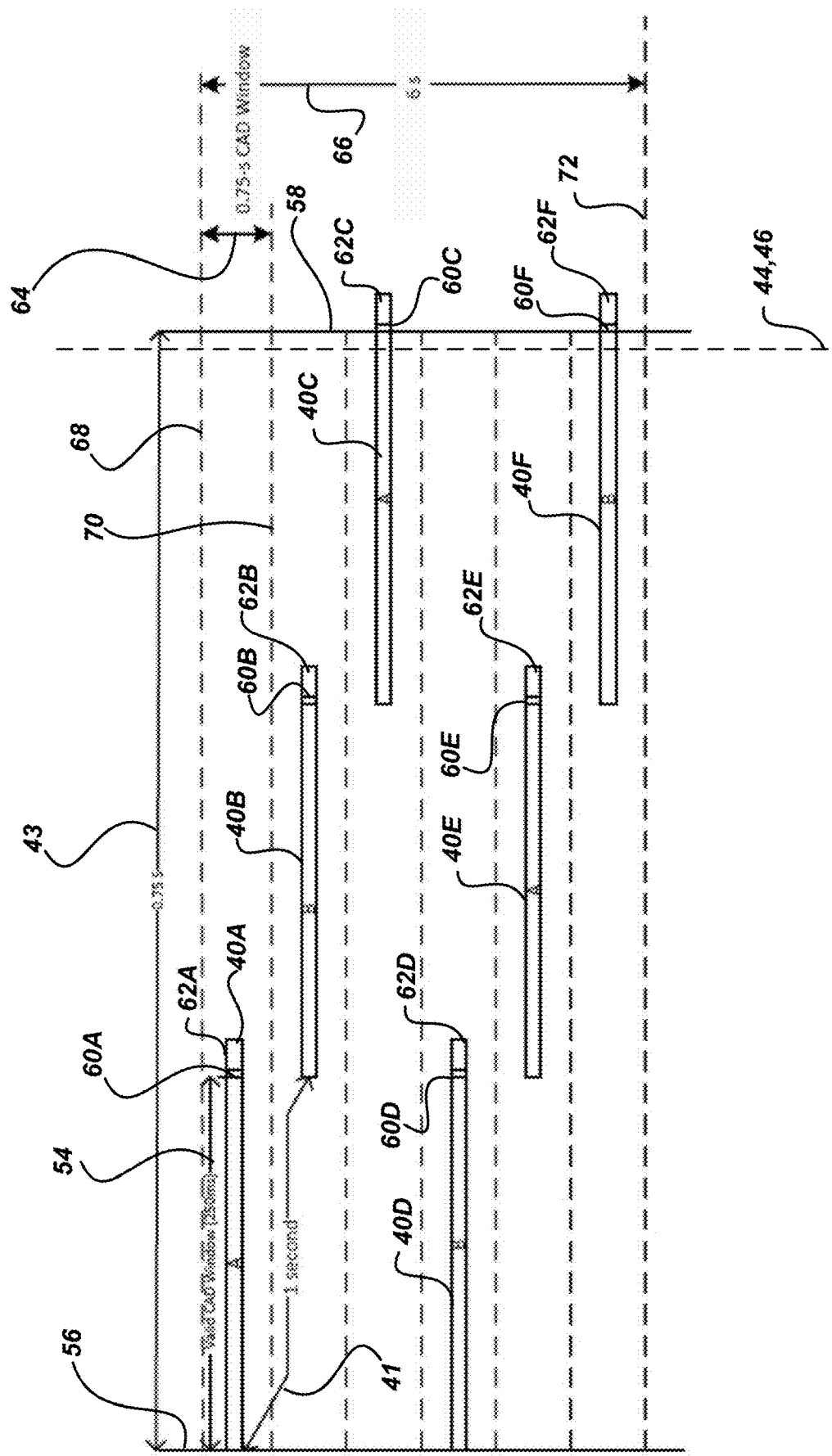
FIG. 5 is a diagram showing the hail messages of FIGS. 3 and 4 in stacked arrangement for ease of illustration to show alignment in channel activity detections of two hail message transmissions across different alternating channels.

FIG. 5 presents an alternate visualization of the timing relationships discussed with regard to FIGS. 3 and 4. FIG. 5 shows hail messages 40A-40F positioned in a stacked and staggered relationship to one another instead of serially, all in a straight line as in FIG. 3. Each of those hail messages 40 includes a valid CAD window exemplified at 54 which, in one implementation, spans around 250 ms. As discussed previously with regard to FIG. 4, not all of the 256 ms—long preamble period is valid, since achieving a successful CAD is not possible if a CAD attempt occurs less than six (6) preamble symbols away from a start frame (such as at 47 of FIG. 4). Such invalid preamble portions are shown for each hail message 40 at 60A-60F. Respective data portions of hail messages 40 are shown at 62A-62F. Since the valid preamble portion of each hail message 40 is 250 ms, as discussed above, a valid preamble portion of any three channel-alternating consecutive hail messages 40 can randomly occur within the 750 ms sniffing window 43, bounded by a start line 56 and an end line 58. The time spacing between hail messages 40 is represented by the vertical dimension lines 64,66. Vertical dimension line 64 represents, on a compressed scale, the 750 ms sniffing window also shown horizontally at 43. Pairs of dashed horizontal lines such as 68,70 set the time boundaries spaced by vertical dimension line 64, and such dashed horizontal lines function as channels between which only a single hail message 40 can occur at any given time. The one-second hail message period of the hail messages 40 is shown at 41. Vertical dimension line 66 indicates that six (6) seconds separate the first dashed horizontal line 68, and a last dashed horizontal line 72. Thus, all six hail messages 40A-40F occur within the six-second window defined by dashed horizontal lines 68,72. As FIG. 5 shows, the respective first and second CAD alignment lines 44,46 are superposed upon one another, as they pass through the valid preamble portions of hail messages 40C and 40F in the manner previously described. No matter where a similar vertical line might be drawn anywhere between the start line 56 and the end line 58, such a vertical line would extend through a valid preamble portion of hail message 40A, 40B, or 40C (each at one of the alternating channels), and would extend through a valid preamble portion of hail message 40D, 40E, or 40F, i.e., three hail messages away from the intersection of that vertical line with one of first three hail messages, with hail messages 40D, 40E, 40F occurring on a different alternating channel from hail messages 40A, 40B, or 40C, respectively. Such a vertical line, like the superposed vertical lines 44,46, would pass through the valid preamble portions of two such hail messages 40 at congruent points that are each spaced at equidistantly from the respective beginnings of the hail messages 40.

Figure 6:
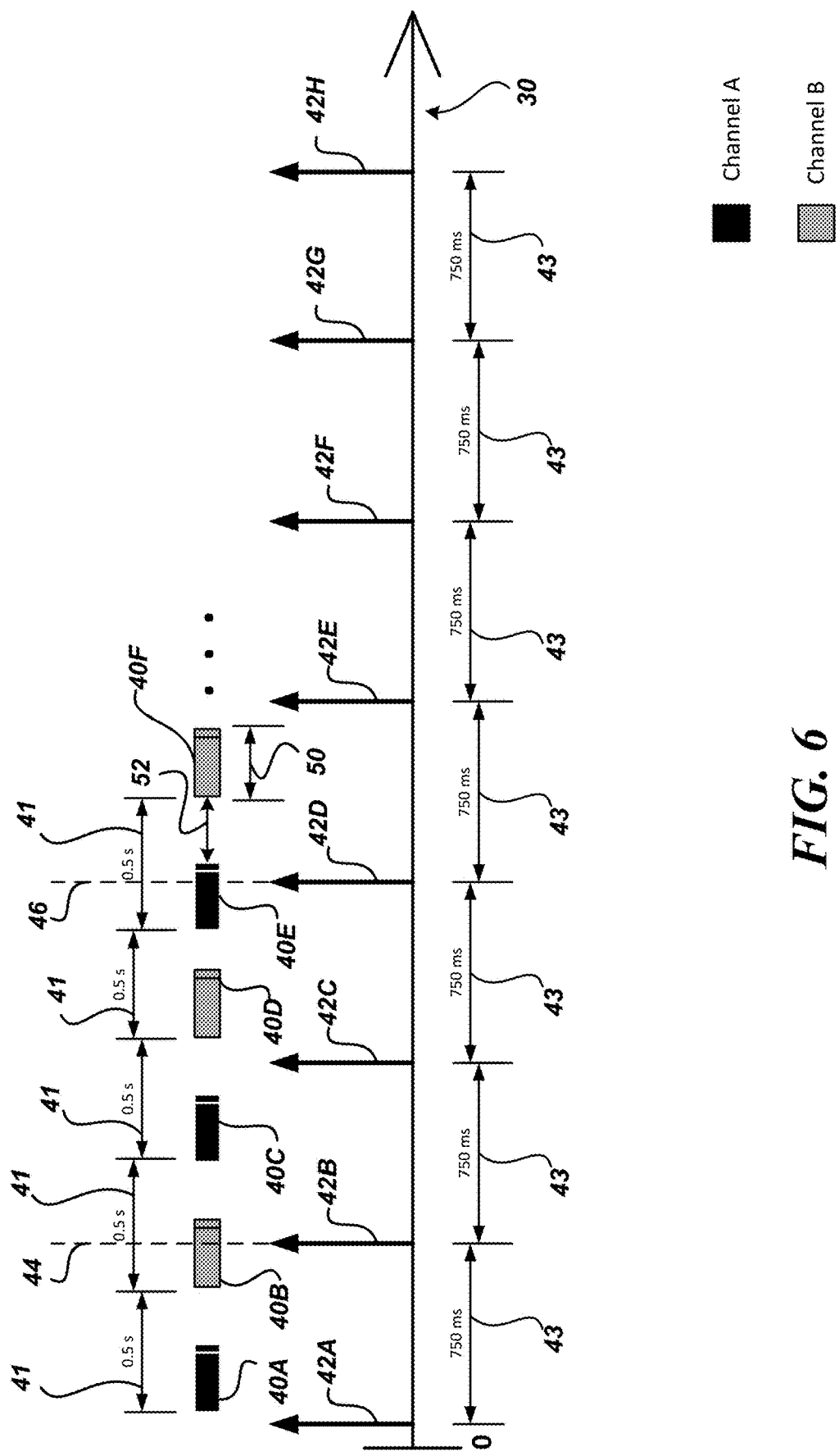
FIG. 6 is a timing diagram similar to FIG. 3, except showing a hail period of 0.5 seconds instead of 1.0 seconds.

FIG. 6 is a timeline diagram similar to that shown in FIGS. 3 and 4, with like dimensions and distances represented by the same corresponding reference numerals. The only differences are that the hail message period 41 is about 0.5 seconds in FIG. 6 instead of the 1.0 seconds in FIG. 3, and that the gap lengths of time 52 each measure about 224 ms (i.e., 0.5 s—hail message length (276 ms)), instead of the 724 ms shown in FIG. 4. Even with those differences, the CAD alignment aspect of the present disclosure, discussed above, still persists. Since, for example, a CAD aligns with a valid preamble portion of hail message 40B, as shown by the dashed line 44 extending upwardly from the tip of DC repeater listening instance 42B, the next CAD occurs three hails away, at hail message 40E, as shown by the dashed line 46 extending upwardly from the tip of DC repeater listening instance 42D and passing through hail message 40E at a distance from its start frame that is equal to the distance between dashed line 44 and the start frame of hail message 40B.

Figure 7:
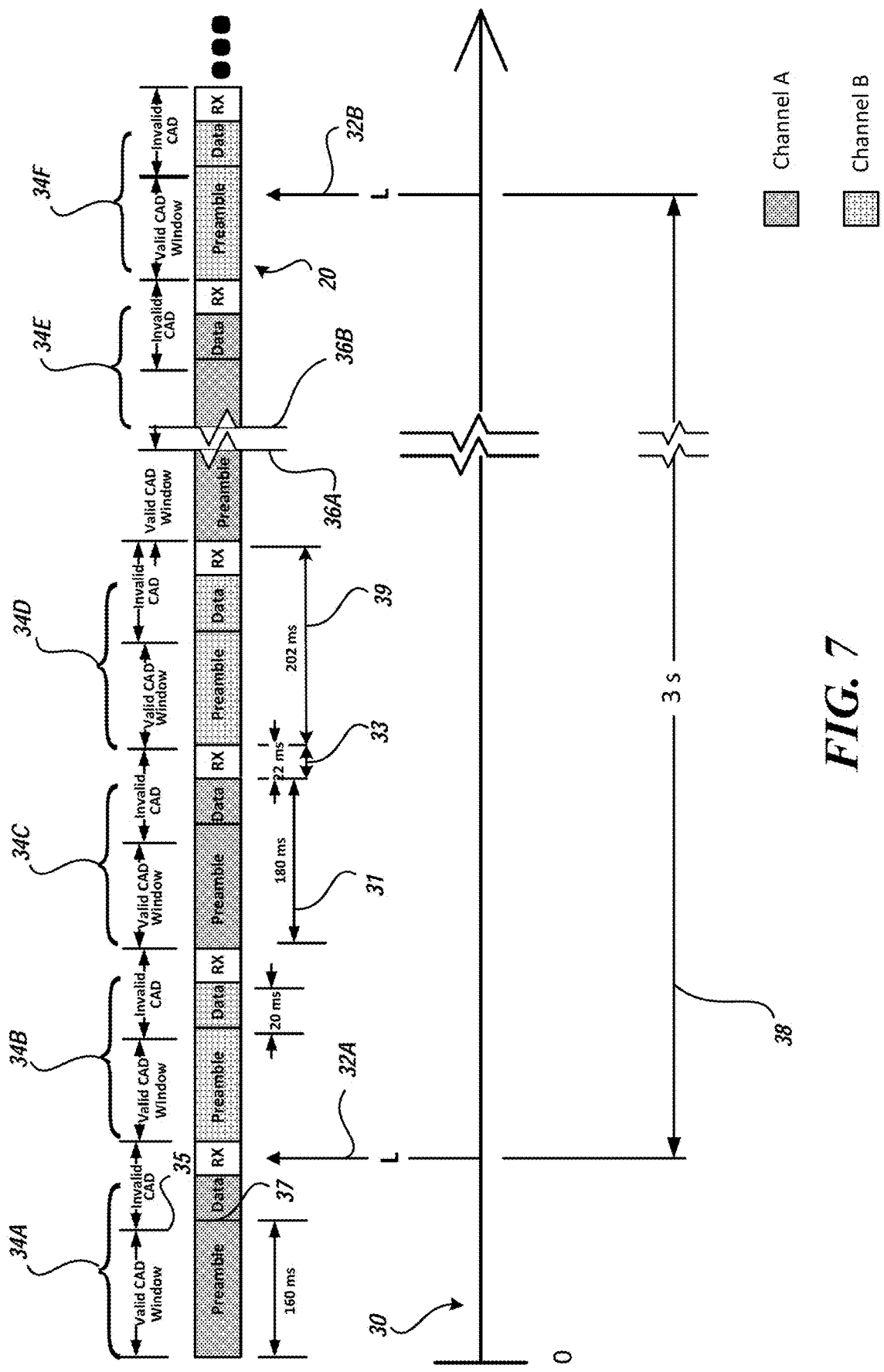
FIG. 7 is a composite timing diagram showing example timing instances of listening by a node with a hailing pattern timing diagram of messages being sent alternately between two hailing channels of the node.

FIG. 7 shows timing relationships involving the hailing of a node 200 rather than of a DC repeater 114 (FIG. 1). In particular, a hailing pattern timing diagram 20 represents a pattern, or sequence, of hail messages 34A-34F (collectively referred to herein as hail messages 34) from a hailing device, such as the DC repeater 114 (FIG. 1). Hailing pattern timing diagram 20 is shown in juxtaposition to timeline 30 illustrating instances of listening 32A,32B by a node 200, the instances of listening 32A,32B separated by an interval 38 which, in one implementation, may be around three seconds. This represents a listening rate that is about 25% of the DC repeater listening rate discussed with regard to FIGS. 3 and 4. Each hail message 44 may include, in one implementation, approximately 160 ms of preamble and 20 ms of data, for a hail message length of time 31 of approximately 180 ms. Each hail message 34 is followed by a period "RX" having a gap length of time 33 of approximately 22 ms where the hailing device tries to receive the ACK signal from a receiving node (also called a "target node" and exemplified at nodes 200B,200C,200D in FIG. 1) on a FHSS channel referenced in the hail message 34. Thus, the hail messages 34 have a period 39 of about 202 ms (i.e., 180 ms+22 ms), which is the distance between beginnings of consecutive hail messages 34. FIG. 7 does not show the entirety of the preamble period of hail message 34E since break line segments 36A,36B interrupt it (though they could have been located anywhere along the length of the hailing pattern timing diagram 20) to indicate that more hail messages are present in the hail pattern during the 3-second regular time interval 38 than are actually shown in FIG. 7. In examples, such as the hailing pattern timing diagram 20 illustrated in FIG. 7, the hail messages are sent alternating between two hailing channels of the receiving node 200 (target node). As shown in FIG. 7, hail messages 34A, 34C, and 34E are sent on Channel "A," and hail messages 34B, 34D, and 34F are sent on Channel "B." FIG. 7 illustrates valid CAD windows and invalid CAD portions of hail messages, in the same manner as does FIG. 4, except that FIG. 7 also shows "Invalid CAD" periods each extending across an "RX" period, across a "Data" period, and extending slightly into the end of each preamble period, shown for each of the hail messages 34 by dimension line segments such as at 35. A start frame 37 separates the preamble portion of a hail message 34 from the data portion. The start frame 37 indicates that the next matter to be transmitted is going to be data and not preamble symbols.

Given the timing relationships discussed with regard to FIG. 7, hail messages 34, in one implementation, are sent at a rate of around five (5) hail messages per second, as compared to the rate of one hail message per second (FIGS. 3 and 4) or two hail messages per second (FIG. 6). The rate at which hail messages 34 are sent is asynchronous with respect to the node listening rate of once every three seconds (FIG. 7), meaning that the timing at which hail messages 34 are sent is independent of the timing of the instances of listening 32A,32B. Also, from the foregoing timing relationships, during transmission of each hail message 34, the sending device (such as the DC repeater 114 of FIG. 1) is in a transmitting mode for a transmitting percentage of about 89% (180 ms/202 ms) of the period 39. This is between three (3) and four (4) times the transmitting percentage discussed with regard to the timing of hail messages 40 in FIGS. 3-5.

Embodiments of the methods and systems are described below with reference to block diagrams and flowchart illustrations of methods, systems, and apparatuses. It will be understood that each block of the block diagrams and flowchart illustrations, and combinations of blocks in the block diagrams and flowchart illustrations, respectively, can be implemented by program instructions. These program instructions may be programmed into programmable processing elements to produce logic that executes on the processing elements to create means for implementing the functions specified in the flowchart block or blocks, which describe and reference specific algorithms and inherent structure for accomplishing the functions as described and further explained herein.

These program instructions may also be stored in a processor-readable memory that can direct a processing apparatus to function in a particular manner, such that the instructions stored in the processor-readable memory produce an article of manufacture including processor-readable instructions for implementing the function specified in the flowchart block or blocks. The program instructions may also be loaded onto a processing apparatus to cause a series of operational steps to be performed on the programmable apparatus to produce a processor-implemented process such that the instructions that execute on the programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based systems that perform the specified functions or steps, or combinations of special purpose hardware and instructions.

It is contemplated that the processor of the present application can operate in a networked environment using logical connections to one or more remote devices. By way of example, a remote device can be a personal computer, portable computer, a server, a router, a network computer, a peer device or other common network node, and so on. Logical connections between the processor and a remote computing device can be made via a local area network and a general wide area network. Such network connections can be through a network adapter. It is further contemplated that such a network adapter can be implemented in both wired and wireless environments, which are conventional and commonplace in offices, enterprise-wide computer networks, intranets, and the Internet.

It is recognized that programs and components reside at various times in different storage components of a device. Any of the disclosed methods can be performed by processor readable instructions embodied on processor-readable media. Such media can be any available media that can be accessed by a processor. By way of example and not meant to be limiting, processor readable media can comprise volatile and non-volatile, removable and non-removable media implemented in any methods or technology for storage of information.

Figure 8:
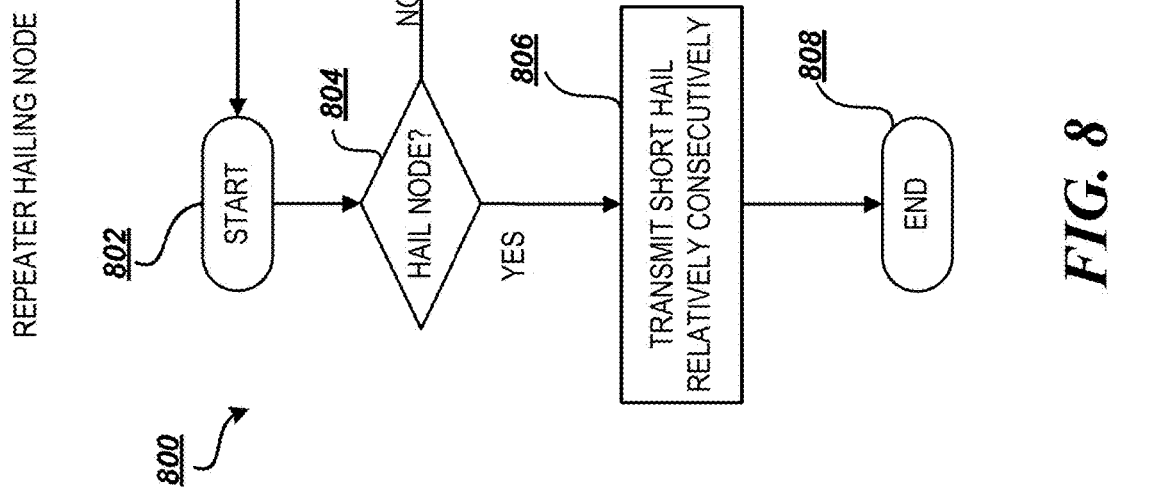
FIG. 8 illustrates a flow diagram of an exemplary method showing steps in the hailing of a node by a DC repeater.

FIG. 8 illustrates a flow diagram of an exemplary method 800 showing steps in the hailing of a node 200 by a DC repeater 114. Method 800 starts at block 802 and proceeds to decision block 804, where it is determined whether a node 200 is to be hailed. If not, the method 800 loops back to start block 802; otherwise, method 800 proceeds to block 806, where the DC repeater 114 transmits a "short hail relatively consecutively." This means that: (i) the hail message length of time 31 of the hail message 34 (FIG. 7) for hailing a node 200 is shorter than the hail message length of time 50 of the hail message 40 (FIG. 4) for hailing a DC repeater 114, and (ii) the gap lengths of time 33 (FIG. 7) occurring when hailing a node 200 are smaller than the gap lengths of time 52 (FIGS. 3 and 4) occurring when hailing a DC repeater 114. After execution of that hailing step at block 806, method 800 proceeds to block 808, where the method 800 ends.

Figure 9:
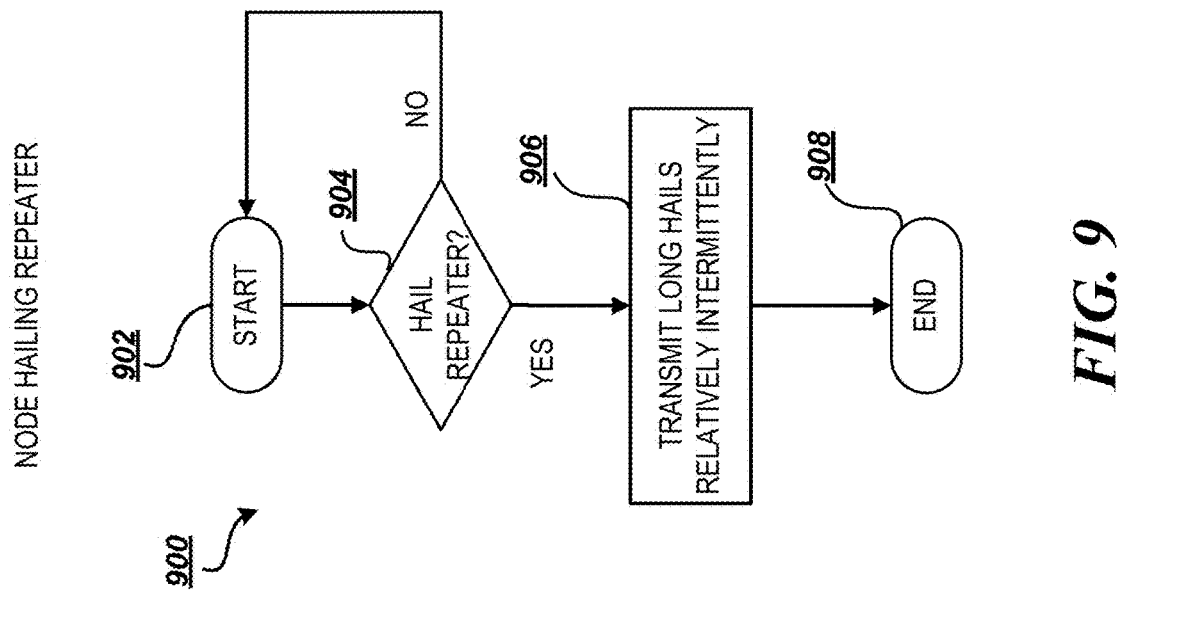
FIG. 9 illustrates a flow diagram of an exemplary method showing steps in the hailing of a DC repeater by a node.

FIG. 9 illustrates a flow diagram of an exemplary method 900 showing steps in the hailing of a DC repeater 114 by a node 200. Method 900 starts at block 902 and proceeds to decision block 904, where it is determined whether a DC repeater 114 is to be hailed. If not, the method 900 loops back to start block 902; otherwise, method 900 proceeds to block 906, where the node 200 transmits "long hails relatively intermittently." This means that: (i) the hail message length of time 50 of the hail message 40 (FIG. 4) for hailing a DC repeater 114 is longer than the hail message length of time 31 of the hail message 34 (FIG. 7) for hailing a node 200, and (ii) the gap lengths of time 52 (FIGS. 3 and 4) occurring when hailing a DC repeater 114 are larger than the gap lengths of time 33 (FIG. 7) occurring when hailing a node 200. After execution of that hailing step at block 906, method 900 proceeds to block 908, where the method 900 ends.

Figure 10:
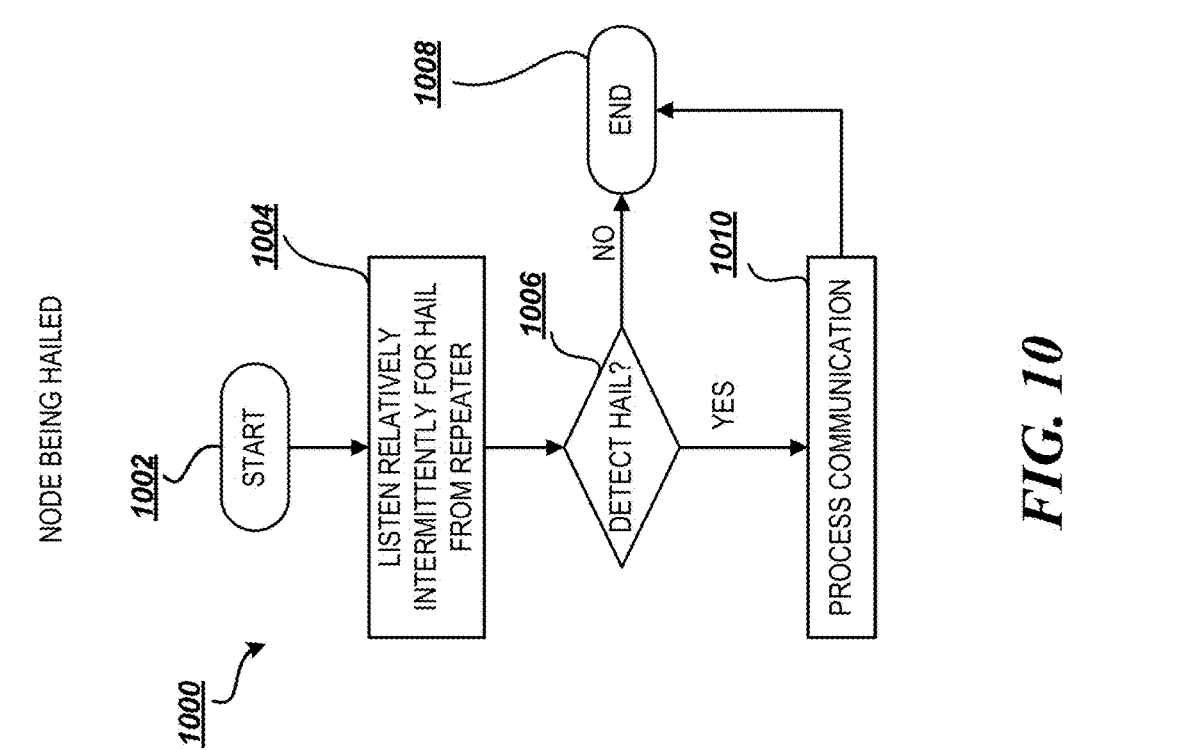
FIG. 10 illustrates a flow diagram of an exemplary method showing steps in how a node listens for and processes a communication.

FIG. 10 illustrates a flow diagram of an exemplary method 1000 showing steps taken by a node 200 when it is hailed by the DC repeater 114. Method 1000 starts at block 1002 and proceeds to block 1004, where the node 200 "listen[s] relatively intermittently for hail from repeater." This means that the node listening rate, which can be once every three seconds (see FIG. 7) is less than, in other words "more intermittent" than, the DC repeater listening rate, which may be once every 750 ms (see FIGS. 3 and 4). From block 1004, method 1000 proceeds to decision block 1006, where it is determined whether the node 200 detects a hail from the DC repeater 114. If not, method 1000 advances to block 1008, where the method 1000 ends. If the node 200 detects a hail, method 1000 proceeds to block 1010, where the node 200 processes the communication from the DC repeater 114. After such processing, the method 1000 advances to block 1008, where the method 1000 ends.

Figure 11:
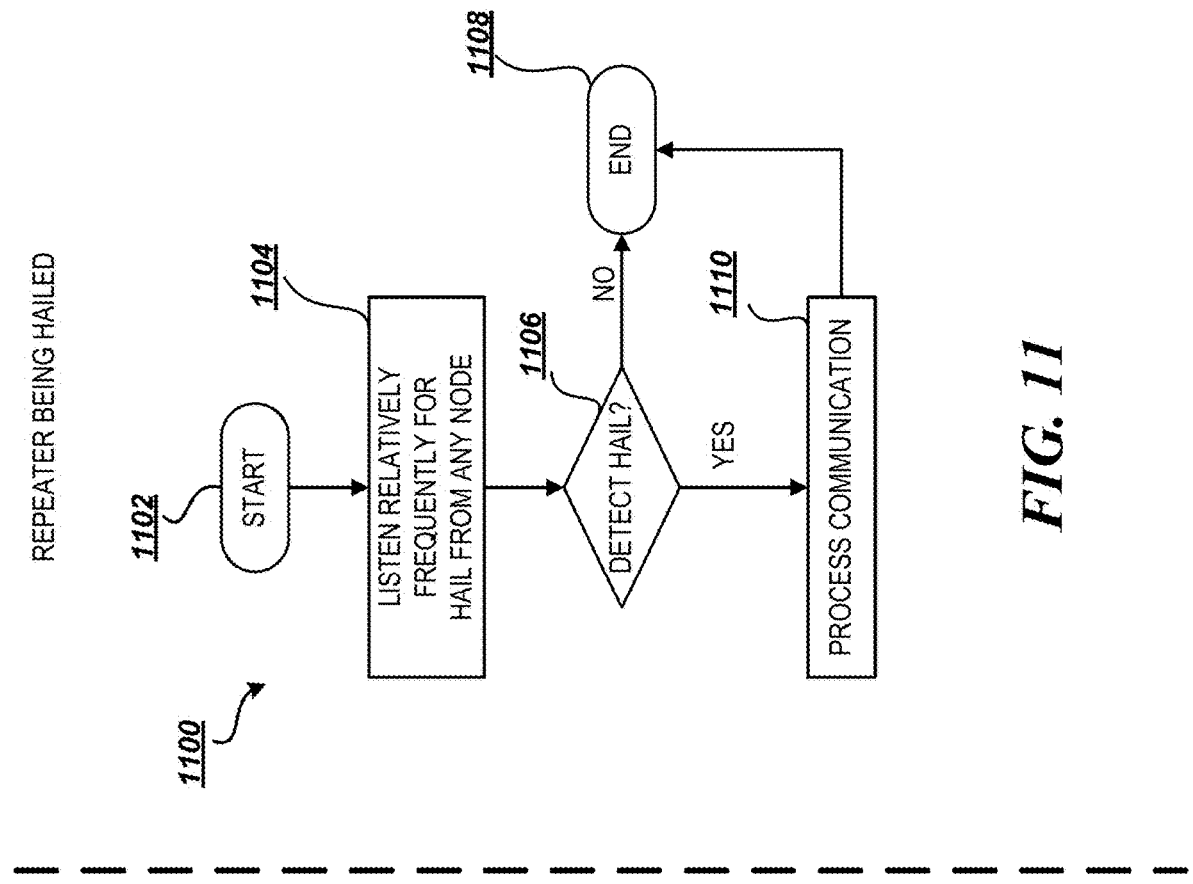
FIG. 11 illustrates a flow diagram of an exemplary method showing steps in how a DC repeater listens for and processes a communication.

FIG. 11 illustrates a flow diagram of an exemplary method 1100 showing steps taken by a DC repeater 114 when it is hailed by a node 200. Method 1100 starts at block 1102 and proceeds to block 1104, where the DC repeater "listen[s] relatively frequently for hail from any node." This means that the DC repeater listening rate, which may be once every 750 ms (see FIGS. 3 and 4) is greater than, in other words "more frequent" than, the node listening rate, which can be once every three seconds (see FIG. 7). From block 1104, method 1100 proceeds to decision block 1106, where it is determined whether the DC repeater 114 detects a hail from a node 200. If not, method 1100 advances to block 1108, where the method 1100 ends. If the DC repeater 114 detects a hail, method 1100 proceeds to block 1110, where the DC repeater 114 processes the communication from the node 200. After such processing, the method 1100 advances to block 1108, where the method 1100 ends.

Although the asymmetrical hailing described herein presents the advantage of being able to use an EDLC in a device to hail a listening device having a 3-second sniffing window, it is to be understood that differing hailing implementations may be used for nodes situated at different locations within a network. For example, if a hailing node is in a network location from which a DC repeater only needs to be hailed infrequently, then preservation of battery power can be best achieved by configuring the DC repeater to sniff for hail messages only once every 3 seconds (or some other comparable period) instead of once every 0.75 seconds, as disclosed with regard to FIGS. 4 and 6. With a DC repeater so configured, the hailing node, if it has an HLC companion device for its battery, could be configured to send hail messages according to the implementation disclosed in FIG. 7 instead of the implementation disclosed in FIGS. 4-6. If instead the hailing node has an EDLC companion device, then it could use the hail message implementation of FIGS. 4-6 and still be able to successfully hail a DC repeater having only a 3-second sniffing window. Thus, either type of hailing implementation can be used for either type of CAD cycle, providing flexibility in how nodes can be configured according to their network location, thereby providing maximum conservation of battery power.

Although several embodiments have been disclosed in the foregoing specification, it is understood by those skilled in the art that many modifications and other embodiments will come to mind to which this disclosure pertains, having the benefit of the teaching presented in the foregoing description and associated drawings. It is thus understood that the disclosure is not limited to the specific embodiments disclosed hereinabove, and that many modifications and other embodiments are intended to be included within the scope of the appended claims. Moreover, although specific terms are employed herein, as well as in the claims which follow, they That which is claimed is:

1. A method of communicating hail messages, comprising:
repeatedly transmitting, by a first device to a second device, a hail message, each transmission of the hail message alternating between two channels;
wherein the hail message includes a preamble portion and a data portion separated from one another by a frame, the preamble portion comprising a sequence of symbols and defining a valid channel activity detection (CAD) window extending from a start of the hail message up to a predetermined number of symbols preceding the frame, the preamble portion further defining an invalid CAD window extending for the predetermined number of symbols preceding the frame;
encountering a failure, during at least one of a first transmission of the hail message and a second transmission of the hail message, to temporally align an instance of listening by the second device with the valid CAD window of the preamble portion; and
after encountering the failure, temporally aligning the valid CAD window of the preamble portion with another instance of listening by the second device, the temporal aligning of the valid CAD window with the another instance of listening by the second device avoiding the invalid CAD window of the preamble portion, and the temporal aligning occurring by no later than an event selected from one of a third transmission of the hail message, the third transmission occurring on one of the two channels, and a sixth transmission of the hail message, the sixth transmission occurring on another one of the two channels.

2. The method of claim 1,
wherein the hail message repeatedly transmitted by the first device is a first hail message, each transmission of the first hail message comprising a first hail repetition,
wherein the first device repeatedly transmits the first hail message at a first hailing rate, wherein a first time between beginnings of each first hail repetition is a first period, each first hail repetition is transmitted for a first length of time, and a first gap extends between an end of each first hail repetition and a start of an ensuing first hail repetition, and
further comprising listening at the first device for a second hail message being repeatedly transmitted to the first device at a second hailing rate, each transmission of the second hail message comprising a second hail repetition, wherein a second time between beginnings of each second hail repetition is a second period, each second hail repetition is transmitted for a second length of time, and a second gap extends between an end of each second hail repetition and a start of an ensuing second hail repetition,
wherein the first period is greater than the second period, the first length of time is greater than the second length of time, and the first gap is greater than the second gap,
wherein the first device listens for the second hail message at a first listening rate that is less than a second listening rate of the second device.

3. The method of claim 2,
wherein the first hailing rate is asynchronous with respect to the second listening rate, and
wherein the second hailing rate is asynchronous with respect to the first listening rate.

4. The method of claim 2, wherein the second hailing rate is five (5) times the first hailing rate.

5. The method of claim 4, wherein the second hailing rate is five (5) hail messages per second, and the first hailing rate is one (1) hail message per second.

6. The method of claim 2, wherein the first listening rate is 25% of the second listening rate.

7. The method of claim 6, wherein three (3) seconds separate each consecutive instance of listening by the first device, and wherein 750 milliseconds separate each consecutive instance of listening by the second device, wherein the second device is a DC repeater.

8. The method of claim 2, wherein the first length of time is about 1.5 times as long as the second length of time.

9. The method of claim 8, wherein the first length of time is 276 milliseconds, and the second length of time is 180 milliseconds.

10. The method of claim 2, wherein the second hailing rate is five (5) hail messages per second, and the first hailing rate is two (2) hail messages per second.

11. The method of claim 1, wherein the predetermined number of symbols is five symbols.

12. A node, comprising:
a processor; and
logic processed by the processor to
repeatedly transmit, to a network device, a hail message, each transmission of the hail message alternating between two channels,
wherein the hail message includes a preamble portion and a data portion separated from one another by a frame, the preamble portion comprising a sequence of symbols and defining a valid channel activity detection (CAD) window extending from a start of the hail message up to a predetermined number of symbols preceding the frame, the preamble portion further defining an invalid CAD window extending for the predetermined number of symbols preceding the frame, and
following a failure, during at least one of a first transmission of the hail message and a second transmission of the hail message, to temporally align an instance of listening by the network device with the valid CAD window of the preamble portion, temporally align the valid CAD window of the preamble portion with another instance of listening by the network device, the temporal aligning of the valid CAD window with the another instance of listening by the network device avoiding the invalid CAD window of the preamble portion, and the temporal aligning occurring by no later than an event selected from one of a third transmission of the hail message, the third transmission occurring on one of the two channels, and a sixth transmission of the hail message, the sixth transmission occurring on another one of the two channels.

13. The node of claim 12, wherein the hail message repeatedly transmitted by the node is a first hail message and wherein the logic is further processed by the processor to
repeatedly transmit the first hail message from the node at a first hailing rate, each transmission of the first hail message comprising a first hail repetition, wherein a first time between beginnings of each first hail repetition is a first period, each first hail repetition is transmitted for a first length of time, and a first gap extends between an end of each first hail repetition and a start of an ensuing first hail repetition, and listen for a second hail message being repeatedly transmitted to the node at a second hailing rate, each transmission of the second hail message comprising a second hail repetition, wherein a second time between beginnings of each second hail repetition is a second period, each second hail repetition is transmitted for a second length of time, and a second gap extends between an end of each second hail repetition and a start of an ensuing second hail repetition, wherein the first period is greater than the second period, the first length of time is greater than the second length of time, and the first gap is greater than the second gap, wherein the logic is further processed by the processor to listen for the second hail message at a first listening rate that is less than a second listening rate of the network device.

14. The node of claim 13, wherein the logic is further processed by the processor to listen at the first listening rate of 25% of the second listening rate.

15. The node of claim 14, wherein three (3) seconds separate each consecutive instance of listening by the node.

16. The node of claim 13, wherein the logic is further processed by the processor to set the first length of time at about 1.5 times the second length of time.

17. The node of claim 13, wherein the first length of time is 276 milliseconds.

18. The node of claim 13, wherein the logic is further processed by the processor to set the first hailing rate to one-fifth of the second hailing rate.

19. The node of claim 18, wherein the first hailing rate is one (1) hail message per second.

20. The node of claim 12, wherein the predetermined number of symbols is five symbols.

* * * * *